United States Patent Office 3,272,609
Patented Sept. 13, 1966

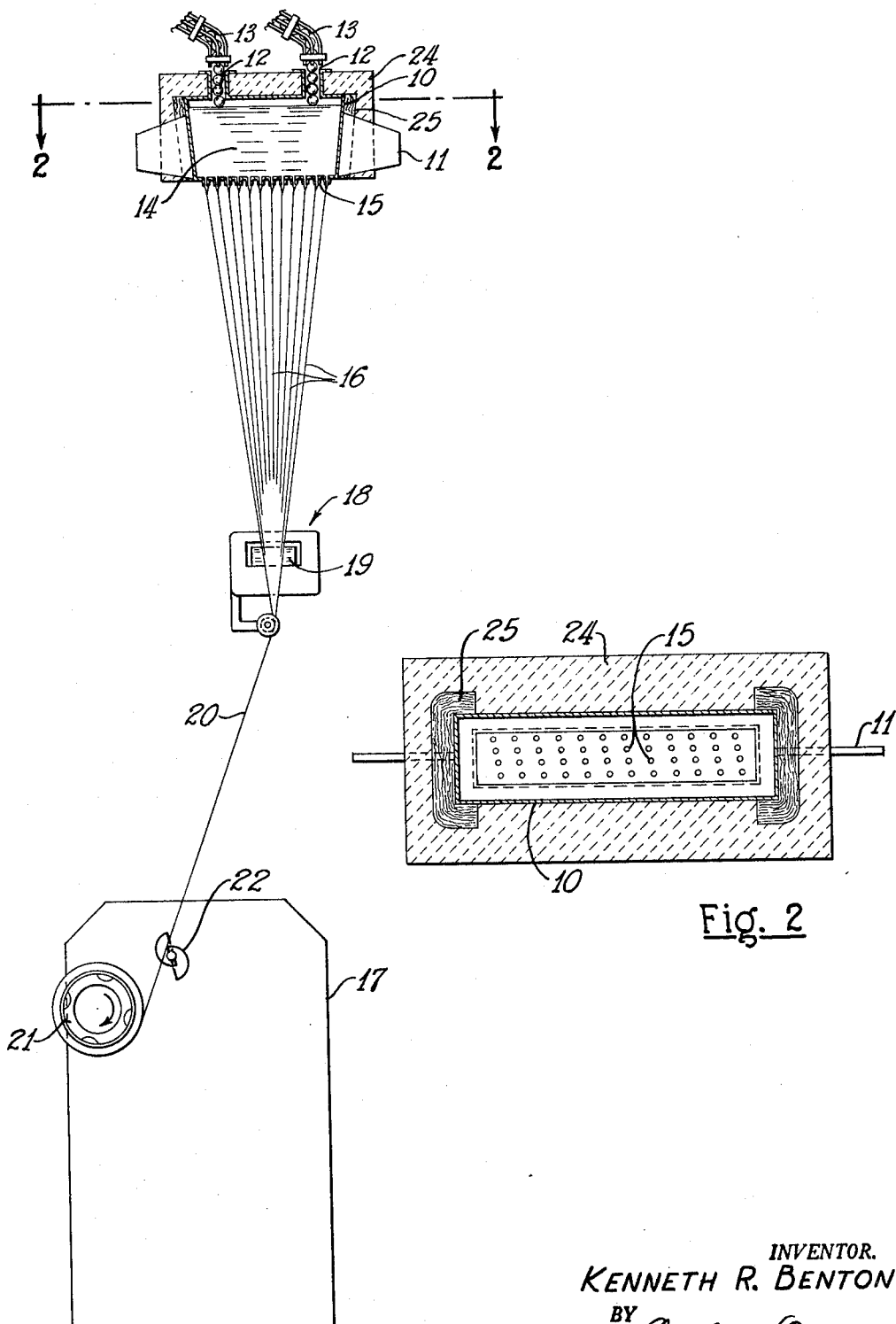

3,272,609
FEEDER FOR PRODUCING FIBERS
Kenneth R. Benton, Anderson, S.C., assignor to Owens-Corning Fiberglas Corporation, a corporation of Delaware
Filed Dec. 1, 1961, Ser. No. 156,378
3 Claims. (Cl. 65—1)

This invention relates to the production of fibers from mineral material and more particularly to an improved feeder for producing those fibers.

Fibers of glass are one of the most commonly used mineral fibers. One of the major markets for glass fibers is as a continuous reinforcing material for organic resins in the production of reinforced resinous materials. When short fine glass fibers are combined and adhered together with a suitable binding material such as a phenol-formaldehyde resin into a loose wool type material they have found great utility as a thermal insulating material, and also as a sound absorbing and vibration dampening material. Glass fibers are produced by supplying a pool of molten fiberizable glass in an electrically heated, generally rectangular feeder with a large number of small orifices in the bottom thereof. The molten material flows through these orifices as a plurality of fine streams which are attenuated to form fine glass fibers. The mineral materials from which glass fibers are formed melt at temperatures in excess of 2000° F. and it is necessary to maintain the feeder above the melting temperature of the mineral materials when forming the fibers therefrom. To provide a more economical operation by preventing the escape of large amounts of heat from these feeders they are often encased in a suitable high temperature insulating material.

Heretofore the feeders were generally insulated by cutting refractory blocks so that they conform to the general contour of the feeder and packing them therearound. This method of insulating the feeder is deficient in several respects including the necessity for highly skilled labor for shaping and installing the insulating blocks. Further, a large amount of heat escapes through cracks between the insulating blocks even when they have been properly installed and this escape of heat contributes to an uneven temperature distribution within the feeder.

This invention provides an improved method for more easily and more effectively insulating the feeder wherein it is supported within a mold and a slurry of a suitable insulating refractory is poured therearound. A suitable refractory would be a high temperature aluminum silicate castable refractory having a "K" value in the range of 2 to 5 B.t.u.'s per hour, per square foot of area, per inch of thickness, per degree Fahrenheit. The slurry is dried in place around the feeder as a continuous cementitious insulating covering. One undesirable characteristic of this type of insulating cement is that it has a negative coefficient of thermal expansion up to about 800° F. and will therefore contract during the initial stages of the heating operation and exert a compressive force on the feeder. Conversely, the metal feeder expands while being heated thereby exaggerating the compressive effect of the contracting refractory on it. Heretofore the compression of the feeder during the initial heating would cause a bending of its sidewalls and creating undesirable variations in its operating characteristics.

To overcome these difficulties this invention provides a resilient cushion of a suitable high temperature material adjacent the feeder which will absorb these changes in the length of the feeder and the encasing insulating refractory thereby greatly reducing the deformation of the feeder because of these thermal changes. The resilient cushions are preferably positioned so as to cover the end walls of the feeder thereby protecting it at the location where the greatest compressive forces occur.

A suitable cushioning material is a resilient blanket of fibers made substantially from aluminum silicate comprising about fifty percent alumina and forty-eight percent silica with two percent trace elements, the ceramic fibers resulting from such materials being in roll form. This fibrous cushion reduces stresses in the insulated feeder resulting from changes in the length of the feeder or the surrounding insulation.

A feeder constructed in accordance with this invention incorporating the compressible refractory fiber pads has another advantage in that the thermal conductivity of the fiber pads is considerably lower than the conductivity of the insulating cement. The placement of these fiber pads at the ends of the feeder decrease the amount of heat lost thereat thereby improving the temperature distribution within the feeder by reducing excessive losses of heat through the bushing ends.

An object of this invention is to provide an improved feeder for the production of glass fibers.

A further object of this invention is to provide a feeder for supplying streams of molten glass having a more nearly uniform distribution of temperature across its width.

Another object of this invention is to provide an improved method of insulating a feeder for supplying molten glass.

Another object of this invention is to provide an insulated feeder having improved strength and rigidity.

Other objects and advantages of this invention will be apparent from the description which follows, reference being had to the accompanying drawings in which:

FIGURE 1 is an elevational view, partially in section, of a process for producing glass fibers, and FIGURE 2 is a sectional plan view on an enlarged scale of an insulated feeder constructed in accordance with this invention.

Referring in greater detail to FIGURE 1, the feeder 10 is generally rectangular in shape and electrically heated by current carrying cables (not shown) attached to its terminals 11. The glass to be melted enters the feeder, often in the form of cullet or small cold marbles 13 of glass, through openings 12 in its top wall. The glass is heated in the feeder and melts to form a rather homogeneous molten mass 14. This molten glass 14 flows through the orifices 15 in the bottom wall of the feeder and is attenuated into many small fibers or filaments 16 by an attenuating winder 17. A suitable protective binder or size is applied to the filaments by the size applicator 18. This is accomplished by passing the individual filaments adjacent a smooth rubber belt 19 which has been covered with the protective sizing material. The sizing sticks to the filaments and functions as a smooth protective coating over each of the filaments. These filaments are gathered together into a strand 20 beneath the binder applicator by a gathering shoe that is constructed of a soft material that will not abrade the filaments. The strand of gathered filaments is wound and collected on the attenuating mandrel 21. The strand of filaments being attenuated is moved back and forth across the package while it is being wound thereon by a suitable traversing mechanism 22 such as are shown in U.S. Patents 2,391,870 and 2,433,304.

These feeders for heating the glass and placing it in a fiber forming condition operate at extremely high temperatures in the order of 2000° F. to 2700° F. They are encased in a covering of a suitable high temperature insulation 24 to prevent excessive loss of heat therefrom. Suitable compressible pads 25 of an insulating material cover the ends of the feeder to absorb differences in thermal expansion between the feeder and encasing insulation.

The positioning of the compressible refractory fiber pads 25 with respect to the feeder is more clearly illustrated in FIGURE 2. As shown, the metal feeder 10 is suitably encased in the high temperature refractory insulation 24. The compressible refractory fiber pads 25 are installed to completely cover the ends of the melting pot 10 and may wrap around the edges thereof so as to protect the ends of the feeder from compression across their width.

When fabricating the completed insulated feeder, an un-insulated feeder is placed in a suitable form for retaining the castable refractory. The compressible pads are then positioned in place adjacent the ends of the feeder. The castable refractory is then poured therearound so that it completely encases the bushing and the refractory fiber pads. This poured in place refractory serves at least two functions in reducing the loss of heat from the feeder and supplying structural strength and rigidity thereto. The feeder with the green insulation thereabout is placed in a suitable oven for several hours to cure and dry the refractory. After drying, the form surrounding the cast refractory is removed and the insulated feeder is ready to be installed. After it has been positioned in its operating location the electrical power leads are connected to the feeder terminals 11. A small amount of glass is placed inside the bushing to protect it against overheating and the power is turned on. The temperature of the feeder is slowly increased. The rate at which the temperature is increased is carefully controlled to prevent cracking from thermal stresses. The bushing gradually expands because of this increase in temperature. Simultaneously therewith the refractory insulation shrinks considerably, perhaps from a crystallization of the material, a change in crystal structure, a loss of moisture therefrom and a corresponding rearranging of the molecules, or for some other reason. This expanding of the bushing and simultaneous shrinking of the refractory causes large longitudinal stresses in the assembly which are absorbed by a reduction in thickness of the compressible refractory fiber pads. By wrapping these compressible pads partially around the ends of the feeder, they are protected against longitudinal compression during the initial heating and the fluid refractory is prevented from flowing between the feeder and the portion of the feeder adjacent the end walls.

It is apparent that within the scope of this invention modifications and different arrangements may be made other than as herein disclosed, such as by the use of other insulations or compressible pads, and the present disclosure is illustrative merely, the invention comprehending all variations thereof.

I claim:
1. An insulated feeder for producing fibers from molten mineral material comprising a generally longitudinal metal chamber having a bottom wall with orifices therein, a refractory type insulating cement cast in situ in completely surrounding relation about the side and end walls of said chamber, compressible pads of high temperature fibrous insulating material interposed between the end walls of said metal chamber and said refractory insulation, said pads being sufficiently compressible that they compensate in compression for differences in thermal expansion between said metal chamber and said refractory insulation, said interposed pads being in direct contact with said feeder walls and being contacted directly by said refractory insulation.

2. A feeder for supplying a plurality of streams of molten glass comprising an elongated melting chamber having a plurality of openings in its bottom wall, a poured in place cast refractory insulation surrounding the side and end walls of said melting chamber, compressible pads of refractory fibers positioned between the ends of said chamber and said insulation, said pads extending at least around the edges of said end walls joining said side walls and along the side walls of said chamber, said pads being in direct contact with said chamber ends and said refractory insulation.

3. An insulated feeder unit for the production of glass fibers comprising an elongated chamber for holding glass in molten condition, said chamber having a bottom wall with openings therein for the delivery of streams of molten glass for attenuation into fibers, compressible pads of fibrous insulating material positioned immediately adjacent and in contact with the end walls of said chamber, and a refractory material cast in situ in surrounding relation about the side and end walls of said chamber and in surrounding direct contacting relationship with said pads of fibrous insulating material, whereby said pads compressibly accept the thermal expansion of said chamber within said refractory material.

References Cited by the Examiner
UNITED STATES PATENTS

| 2,282,293 | 5/1942 | Christenson | 50—434 X |
| 2,875,893 | 3/1959 | Russell et al. | 65—1 X |

DONALL H. SYLVESTER, *Primary Examiner.*

P. GOLDSTEIN, R. L. LINDSAY, *Assistant Examiners.*